(12) United States Patent
Sunil Kumar et al.

(10) Patent No.: US 10,768,011 B2
(45) Date of Patent: Sep. 8, 2020

(54) METHOD AND SYSTEM FOR POSITIONING AN AUTONOMOUS VEHICLE ON A NAVIGATION MAP

(71) Applicant: Wipro Limited, Bangalore (IN)

(72) Inventors: Balaji Sunil Kumar, Bengaluru (IN); Manas Sarkar, Kolkata (IN); Shyam Sundar Pal, Kolkata (IN)

(73) Assignee: Wipro Limited, Bangalore (IN)

( * ) Notice: Subject to any disclaimer, the term of this patent is extended or adjusted under 35 U.S.C. 154(b) by 343 days.

(21) Appl. No.: 15/787,784

(22) Filed: Oct. 19, 2017

(65) Prior Publication Data

US 2019/0063943 A1 Feb. 28, 2019

(30) Foreign Application Priority Data

Aug. 31, 2017 (IN) .............................. 201741030905

(51) Int. Cl.
| | |
|---|---|
| *G01S 1/00* | (2006.01) |
| *G01S 1/24* | (2006.01) |
| *G01C 21/36* | (2006.01) |
| *G05D 1/02* | (2020.01) |
| *G01C 21/30* | (2006.01) |
| *G01S 19/49* | (2010.01) |

(52) U.S. Cl.
CPC ............ *G01C 21/367* (2013.01); *G01C 21/30* (2013.01); *G01S 19/49* (2013.01); *G05D 1/024* (2013.01); *G05D 1/027* (2013.01); *G05D 1/0274* (2013.01)

(58) Field of Classification Search
CPC ....... G01C 21/367; G01C 21/32; G01C 21/30; G01C 21/20; G01S 19/48; G01S 19/49; G01S 19/42; G01S 19/51; G05D 1/024; G05D 1/027; G05D 1/0274
USPC .......................................................... 701/472
See application file for complete search history.

(56) References Cited

U.S. PATENT DOCUMENTS

2017/0038477 A1* 2/2017 Schmid .................... G01S 19/48
2017/0122749 A1* 5/2017 Urano ..................... G01C 21/30
2017/0307746 A1* 10/2017 Rohani ................... G01S 13/42

* cited by examiner

*Primary Examiner* — Mahmoud S Ismail
(74) *Attorney, Agent, or Firm* — Finnegan, Henderson, Farabow, Garrett & Dunner, LLP

(57) ABSTRACT

Disclosed herein are a method and system for positioning an autonomous vehicle on a navigation map. The method includes positioning the autonomous vehicle on the navigation map, including receiving the navigation map, an approximate position and an approximate orientation of the autonomous vehicle on the navigation map, and an environmental field of view (FOV) of the autonomous vehicle and determining a first road boundary based on the navigation map and the approximate position of the autonomous vehicle, and a second road boundary based on the environmental FOV and the approximate orientation of the autonomous vehicle, further determining at least one of an angular deviation and a lateral deviation between the first road boundary and the second road boundary, and positioning the autonomous vehicle on the navigation map by minimizing at least one the angular deviation and the lateral deviation.

20 Claims, 7 Drawing Sheets

METHOD AND SYSTEM FOR POSITIONING AN AUTONOMOUS VEHICLE ON A NAVIGATION MAP

TECHNICAL FIELD

This disclosure relates generally to autonomous vehicle, and more particularly to method and system for positioning an autonomous vehicle on a navigation map.

BACKGROUND

Autonomous vehicles may facilitate efficient transportation in coming times. The autonomous vehicle may be capable of sensing the dynamic changing environment, and of navigating without any human intervention. The autonomous vehicle may employ a variety of techniques to detect its surroundings, such as radar, laser light, GPS, odometry, and computer vision. Additionally, the autonomous vehicle may employ a variety of technique to perform navigation on a navigation path by taking into consideration its detected surroundings. For example, it is important to initially position the autonomous vehicle on a navigation map in order to provide the vehicle a smooth start for navigation.

In a known territory, vehicle's position may be determined by identifying specific landmarks at per-determined positions, and by observing them by a camera on the vehicle. However, this technique does not work accurately on a new unmarked road area. Further, placing the vehicle in the exactly same position on the real environment is a challenge.

SUMMARY

In one embodiment, a method for positioning an autonomous vehicle on a navigation map is disclosed. In one example, the method may include receiving the navigation map, an approximate position and an approximate orientation of the autonomous vehicle on the navigation map, and an environmental field of view (FOV) of the autonomous vehicle. The method may further include determining a first road boundary based on the navigation map and the approximate position of the autonomous vehicle, and a second road boundary based on the environmental FOV and the approximate orientation of the autonomous vehicle. The method may further include determining at least one of an angular deviation and a lateral deviation between the first road boundary and the second road boundary. The method may further include positioning the autonomous vehicle on the navigation map by minimizing at least one the angular deviation and the lateral deviation.

In one embodiment, a system for positioning an autonomous vehicle on a navigation map is disclosed. In one example, the system may include at least one processor and a memory communicatively coupled to the at least one processor. The memory may store processor-executable instructions, which, on execution, may cause the processor to receive the navigation map, an approximate position and an approximate orientation of the autonomous vehicle on the navigation map, and an environmental field of view (FOV) of the autonomous vehicle. The processor-executable instructions, on execution, may further cause the processor to determine a first road boundary based on the navigation map and the approximate position of the autonomous vehicle, and a second road boundary based on the environmental FOV and the approximate orientation of the autonomous vehicle. The processor-executable instructions, on execution, may further cause the processor to determine at least one of an angular deviation and a lateral deviation between the first road boundary and the second road boundary. The processor-executable instructions, on execution, may further cause the processor to position the autonomous vehicle on the navigation map by minimizing at least one the angular deviation and the lateral deviation.

In one embodiment, a non-transitory computer-readable medium storing computer-executable instructions for positioning an autonomous vehicle on a navigation map is disclosed. In one example, the stored instructions, when executed by a processor, may cause the processor to perform operations including receiving the navigation map, an approximate position and an approximate orientation of the autonomous vehicle on the navigation map, and an environmental field of view (FOV) of the autonomous vehicle. The operations may further include determining a first road boundary based on the navigation map and the approximate position of the autonomous vehicle, and a second road boundary based on the environmental FOV and the approximate orientation of the autonomous vehicle. The operations may further include determining at least one of an angular deviation and a lateral deviation between the first road boundary and the second road boundary. The operations may further include positioning the autonomous vehicle on the navigation map by minimizing at least one the angular deviation and the lateral deviation.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
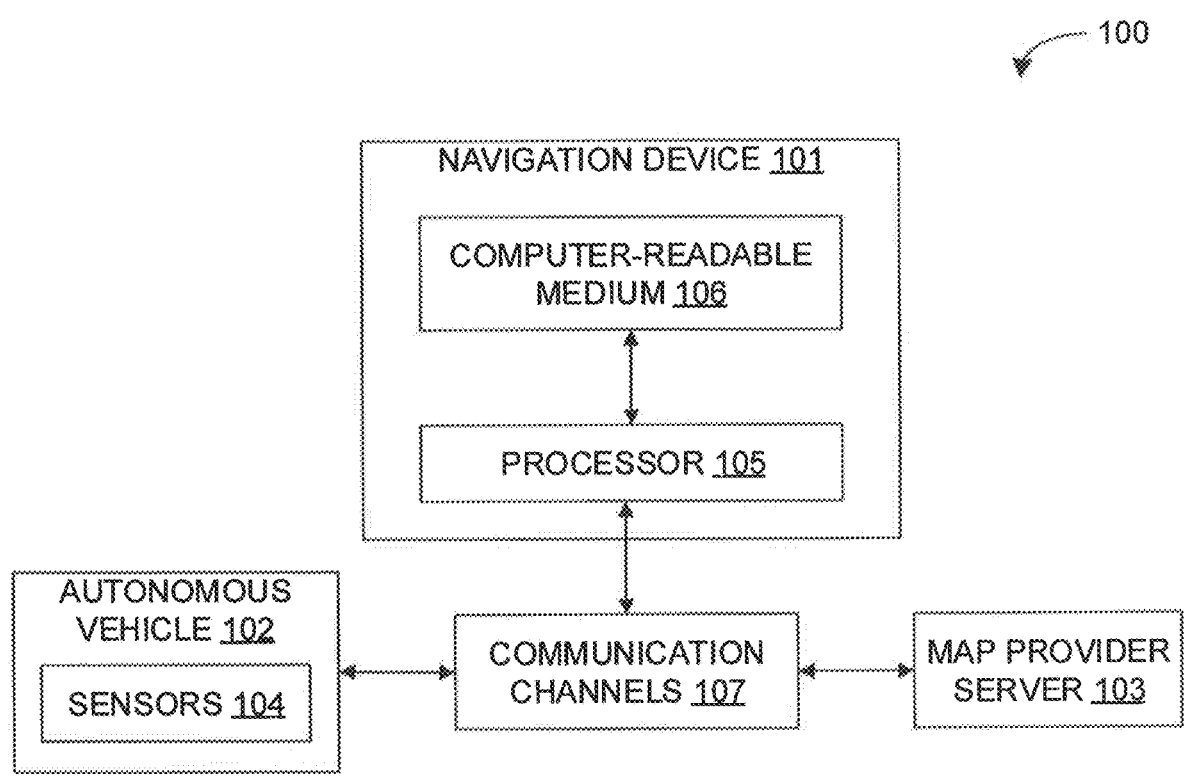
FIG. 1 is a block diagram of an exemplary system for positioning an autonomous vehicle on a navigation map in accordance with some embodiments of the present disclosure.

Referring now to FIG. 1, an exemplary system 100 for positioning an autonomous vehicle on a navigation map is illustrated in accordance with some embodiments of the present disclosure. In particular, the system 100 may include a navigation device 101, an autonomous vehicle 102, and a map provider server 103. The navigation device 101 may receive a navigation path on a pre-generated navigation map from the map provider server 103, and may position the autonomous vehicle 102 on the navigation path. As will be appreciated by those skilled in the art, the map provider server 103 may be a server of a service provider that may provide the pre-generated navigation map (i.e., a detailed geographic map of the region) such as a pre-generated LIDAR map along with the navigation path between a source and a destination.

Further, as will be appreciated by those skilled in the art, the autonomous vehicle 102 may be any vehicle capable of sensing the dynamic changing environment, and of navigating without any human intervention. Thus, the autonomous vehicle 102 may include at least a number of sensors 104, a vehicle drivetrain, and a processor based control system, among other components. The one or more sensors 104 may enable sensing the dynamic changing environment, and may include a global positioning system (GPS) sensor, an inertia measurement unit (IMU), a laser scanner, a light detection and ranging (LIDAR) scanner, a short range radar, a camera, an ultrasonic sensor, and so forth. The one or more sensors 107 may capture various sensor parameters such as current position (location) and orientation (pose or direction) of the autonomous vehicle 102 within a global reference frame, a 360 degree field of view (FOV) of the environment, an image of the environment, a presence of any other object in the vicinity of the autonomous vehicle 102, and so forth. As will be appreciated, the sensor parameters may enable the navigation device 101 to position the autonomous vehicle 102 on the navigation path within the pre-generated navigation map. The processor based control system may receive sensors parameters from the sensors 104 so as to identify appropriate navigation path and obstacle of the dynamically changing environment. The processor based control system may process sensor data, and may accordingly control the vehicle drivetrain.

As will be appreciated, at the beginning of the navigation, the autonomous vehicle 102 may need to adjust its initial position and orientation with respect to the navigation path based on the currently observed environmental data. The navigation device 101 may therefore implement a positioning engine for positioning the autonomous vehicle 102 on the navigation path in accordance with some embodiments of the present disclosure. As will be described in greater detail in conjunction with FIG. 2, the positioning engine may receive a navigation path on a pre-generated navigation map from the map provider server 103, a position and an orientation of the autonomous vehicle 102 with respect to the navigation path from the sensors 104, and an environmental FOV from the sensors 104. The positioning engine may further determine a first road boundary based on the navigation map and the approximate position of the autonomous vehicle 102, and a second road boundary based on the environmental FOV and the approximate orientation of the autonomous vehicle 102. The positioning engine may further determine at least one of an angular deviation and a lateral deviation between the first road boundary and the second road boundary, and may position the autonomous vehicle 102 on the navigation map by minimizing at least one the angular deviation and the lateral deviation.

The navigation device 101 may include one or more processors 105, and a computer-readable medium (e.g., a memory) 106. The computer-readable medium 106 may store instructions that, when executed by the one or more processors 105, may cause the one or more processors 105 to position the autonomous vehicle 102 on the navigation map in accordance with aspects of the present disclosure. The computer-readable storage medium 106 may also store multiple system parameters captured by the sensors 104 and other data as required or as processed by the navigation device 101 or the system 100. The one or more processors 105 may perform data processing functions so as to receive the navigation path on the navigation map, receive environmental FOV, receive position and orientation of the autonomous vehicle 102, identify the first road boundary, determine the second road boundary, determine angular deviation or lateral deviation, and position the autonomous vehicle on the navigation path.

Each of the navigation device 101, the autonomous vehicle 102, and the map provider server 103 may interact among each other over various communication channels 107. For example, in some embodiments, the navigation device 101 may receive navigation map along with navigation path from the map provider server 103 over a communication channel 107, and may receive sensor data from the autonomous vehicle 102 over a separate communication channel 107. Alternatively, in some embodiments, the autonomous vehicle 102 may receive the navigation map along with navigation path from the map provider server 103 over a communication channel 107, while the navigation device 101 may receive the sensor parameters as well as the navigation map along with the navigation path from the autonomous vehicle 102 over a separate communication channel 108. Further, in some embodiments, the autonomous vehicle 102 may receive angular and/or lateral deviation from the navigation device 101 over the communication channel 107. In some embodiments, the autonomous vehicle 102 may also receive the navigation map along with the navigation path from the navigation device 101 over the communication channel. Alternatively, in some embodiments, the autonomous vehicle 102 may receive positioning instructions (e.g., a number of maneuverability sequences) from the navigation device 101. The communication channel 108 may be any wired or wireless communication channel based on different communication technologies (e.g., satellite communication technology, television communication technology, mobile communication technologies, WiFi, WiMax, optical fibre, coaxial cable, universal serial bus (USB), high-definition multimedia interface (HDMI), Bluetooth, and so forth).

As will be appreciated, in some embodiments, the navigation device 101 may be located locally with respect to the autonomous vehicle 102. For example, in some embodiments, the navigation device 101 may be a separate device in communication with the autonomous vehicle 102. Alternatively, in some embodiments, the navigation device 101 may be embedded within the autonomous vehicle 102. Further, as will be appreciated, in some embodiments, the navigation device 101 may be located remotely with respect to the autonomous vehicle 102. For example, in some embodiments, the navigation device 101 may be located in a remote server of a navigation service provider. Alternatively, in some embodiments, the navigation device 101 may be embedded within the map provider server 103.

Further, as will be appreciated, in some embodiments, various components of the navigation device 101 may be physically located together in one device. Alternatively, in some embodiments, the components of the navigation device 101 may be physically distributed across various devices. For example, the processors 105 and the computer readable medium 106 of the navigation device 101 may be physically located together in one device (e.g., the navigation device 101) or may be physically distributed across various devices (e.g., the navigation device 101, the autonomous vehicle 102, and/or the map provider server 103). Similarly, in some embodiments, some or all of the sensors 104 may be a part of the navigation device 101 even though they may be located in the autonomous vehicle 102.

Figure 2:
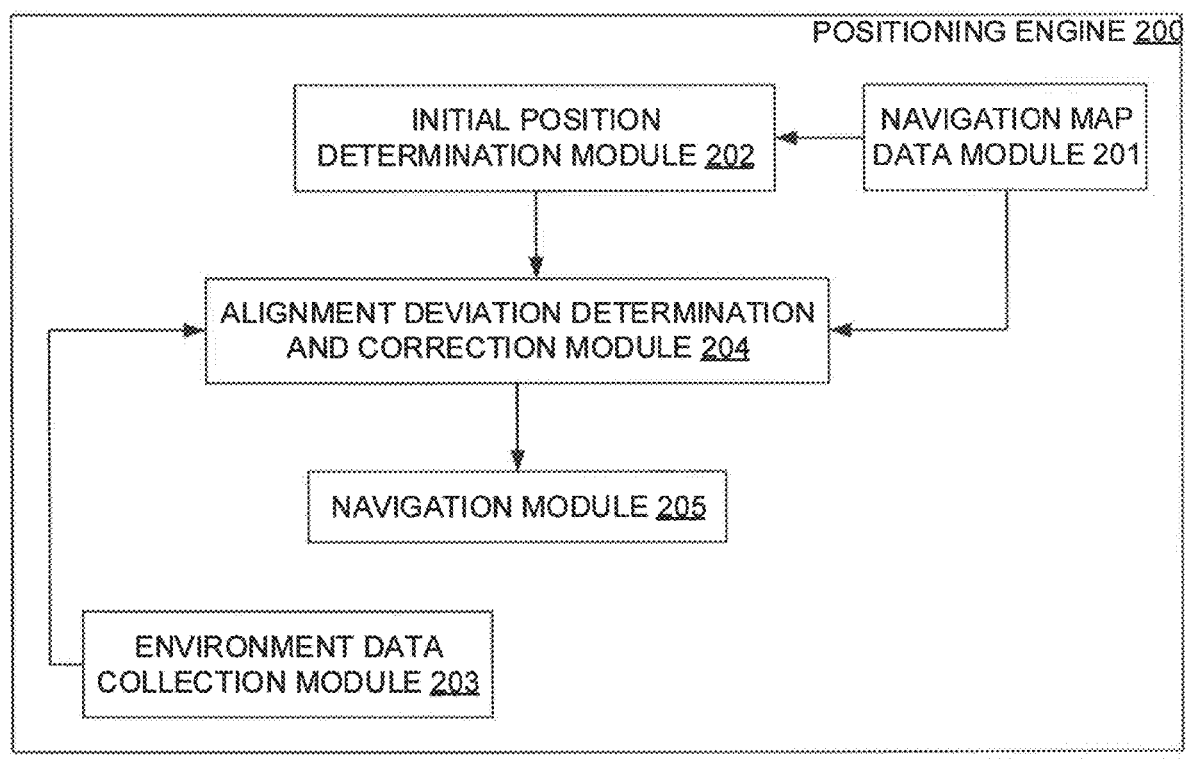
FIG. 2 is a functional block diagram of a positioning engine in accordance with some embodiments of the present disclosure.

Referring now to FIG. 2, a functional block diagram of the positioning engine 200 implemented by the navigation device 101 of the system 100 of FIG. 1 is illustrated in accordance with some embodiments of the present disclosure. The positioning engine 200 may include various modules that perform various functions so as to position the autonomous vehicle on the navigation path. In some embodiments, the positioning engine 200 includes a navigation map data module 201, an initial position determination module 202, an environmental data collection module 203, an alignment deviation determination and correction module 204, and a navigation module 205. As will be appreciated by those skilled in the art, each of the modules 201-205 may reside, in whole or in parts, on any of the navigation device 101 and the autonomous vehicle 102.

The navigation map data module 201 may receive a pre-generated navigation map (e.g., a pre-generated LIDAR map) of a geographic region where the autonomous vehicle may navigate. In particular, the navigation map data module 201 may receive a navigation path between a source and a destination on the pre-generated navigation map. The navigation map data module 201 may receive the pre-generated navigation map from the map provider server or from a local storage. It should be noted that the pre-generated navigation map in the local storage may be from the map provider server either from an earlier instance or from a prior request (e.g., prior to start of the navigation). The navigation map data module 201 may then provide the navigation map to the initial position determination module 202, and to the alignment deviation determination and correction module 204.

The initial position determination module 202 may receive the navigation path on the navigation map from the navigation map data module 201. Additionally, the initial position determination module 202 may receive GPS data from the GPS sensor and IMU data from IMU sensor. As will be appreciated, GPS data records approximate location or position of the GPS sensor while the IMU data records the precise orientation of the IMU sensor at that location. The initial position determination module 202 may then localize the autonomous vehicle with respect to the navigation path on the navigation map, based on the GPS data and IMU data. The localization involves determining an approximate position of the vehicle (based on the GPS data), and determining an orientation (i.e., direction or pose) of the autonomous vehicle (based on the IMU data) with respect to the navigation path on the navigation map. The initial position determination module 202 may then provide the position and the orientation of the autonomous vehicle with respect to the navigation path on the navigation map to the alignment deviation determination and correction module 204.

The environment data collection module 203 may receive current environment data captured through different sensors (e.g., laser scanner, LIDAR scanner, short range radar, camera, ultrasonic sensor, etc.). The environment data collection module 203 may then construct the environmental FOV (e.g., a pre-defined region in front of the autonomous vehicle) from the current environment data (e.g., LIDAR data), and may provide the environmental FOV to the alignment deviation determination and correction module 204.

The alignment deviation determination and correction module 204 may receive the navigation path on the navigation map from the navigation map data module 201, the position and the orientation of the autonomous vehicle with respect to the navigation path on the navigation map from the initial position determination module 202, and the environmental FOV from the environment data collection module 203. The alignment deviation determination and correction module 204 may then identify a first road boundary based on the navigation map and the approximate position of the autonomous vehicle. In some embodiments, the first road boundary may be a pre-identified road boundary in the navigation map in a direction of movement of the autonomous vehicle. The alignment deviation determination and correction module 204 may also determine a second road boundary based on the environmental FOV and the approximate orientation of the autonomous vehicle. In some embodiments, the second road boundary may be determined from a region in the environmental FOV that may be in a vicinity of at least a portion of the first road boundary. The second road boundary may be then determined from the region by determining a plurality of data points ordered in a substantially straight line within the region and with respect to the orientation of the autonomous vehicle. It should be noted that, in some embodiments, the first road boundary may be a left road boundary of the navigation map, while the second road boundary may be a left road boundary of the environmental FOV. Alternatively, it should be noted that, in some embodiments, the first road boundary may be a right road boundary of the navigation map, while the second road boundary may be a right road boundary of the environmental FOV.

The alignment deviation determination and correction module 204 may further determine a lateral and/or an angular deviation in the position and/or orientation of the autonomous vehicle based on the first road boundary and the second road boundary. In some embodiments, the angular deviation may be an angle (e.g., theta) and an angular direction between the first road boundary and the second road boundary. Similarly, in some embodiments, the lateral deviation may be a distance (e.g., delta) and a shift direction between the first road boundary and the second road boundary upon correction of the angular deviation. Additionally, the alignment deviation determination and correction module 204 may determine a number of maneuverability sequences to minimize the angular deviation and/or the lateral deviation so as to align the first road boundary and the second road boundary (i.e., the navigation map's road boundary may overlap with the environmental FOV's road boundary), thereby positioning the autonomous vehicle on the navigation map correctly. The alignment deviation determination and correction module 204 may then perform the number of maneuverability sequences on the autonomous vehicle.

For example, upon determining the maneuverability sequences, the alignment deviation determination and correction module 204 may generate a sequence of command velocities corresponding to the number of maneuverability sequences. The alignment deviation determination and correction module 204 may then provide the maneuverability sequences and corresponding sequence of command velocities to the vehicle control system so as to correctly position the autonomous vehicle on the navigation map. The control may then pass to the navigation module 205 that may perform path planning and navigation from the corrected position.

It should be noted that the positioning engine 200 may be implemented in programmable hardware devices such as programmable gate arrays, programmable array logic, programmable logic devices, and so forth. Alternatively, the positioning engine 200 may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together, but may include disparate instructions stored in different locations which, when joined logically together, include the engine and achieve the stated purpose of the engine. Indeed, an engine of executable code could be a single instruction, or many instructions, and may even be distributed over several different code segments, among different applications, and across several memory devices.

As will be appreciated by one skilled in the art, a variety of processes may be employed for positioning an autonomous vehicle on a navigation map. For example, the exemplary system 100 and the associated positioning engine 200 may determine deviation of the autonomous vehicle and subsequently position the autonomous vehicle on the navigation map by the processes discussed herein. In particular, as will be appreciated by those of ordinary skill in the art, control logic and/or automated routines for performing the techniques and steps described herein may be implemented by the system 100 and the associated positioning engine 200, either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3:
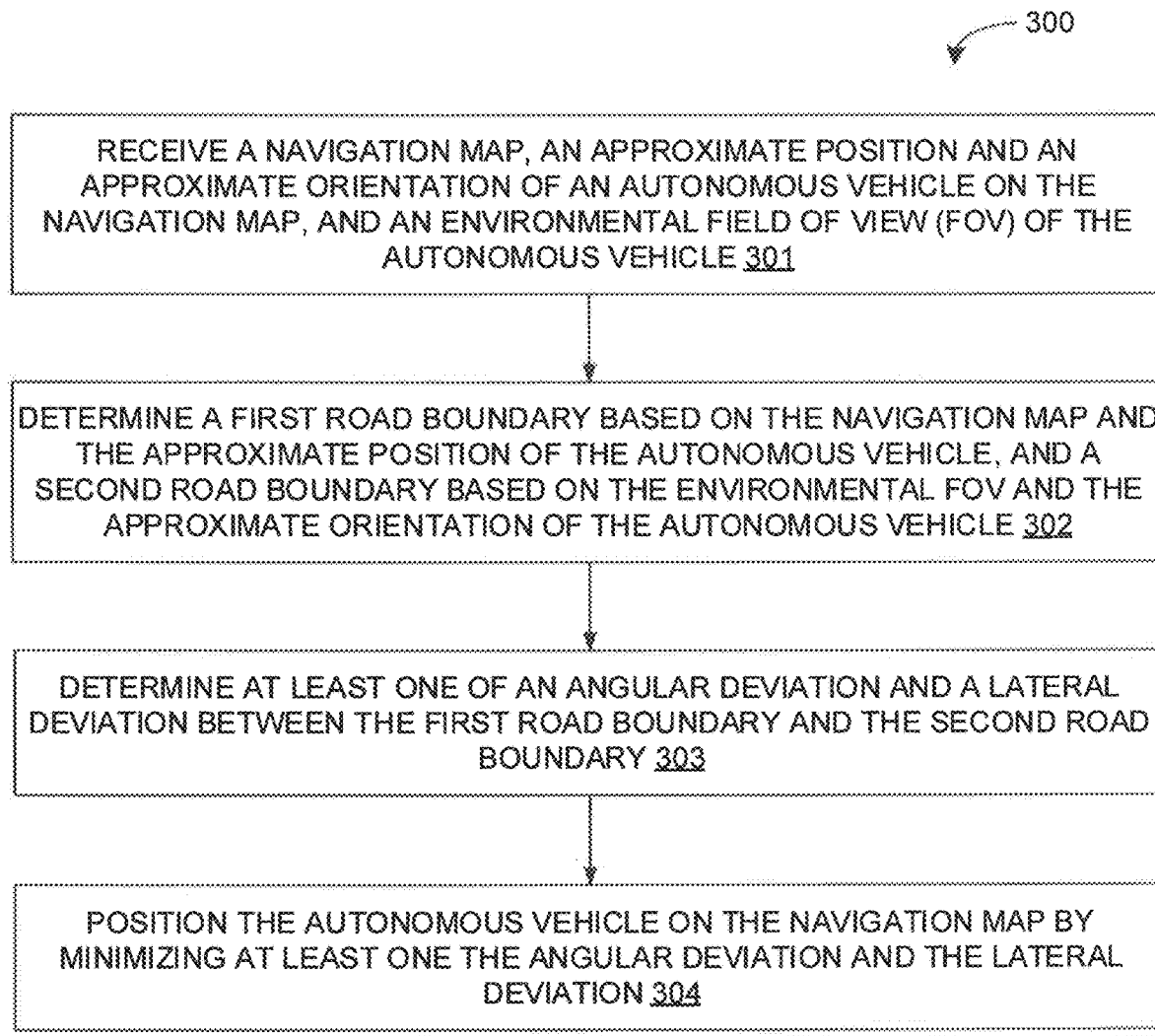
FIG. 3 is a flow diagram of an exemplary process for positioning an autonomous vehicle on a navigation map in accordance with some embodiments of the present disclosure.

For example, referring now to FIG. 3, exemplary control logic 300 for positioning an autonomous vehicle on a navigation map via a system, such as system 100, is depicted via a flowchart in accordance with some embodiments of the present disclosure. As illustrated in the flowchart, the control logic 300 may include the step of receiving the navigation map, an approximate position and an approximate orientation of the autonomous vehicle on the navigation map, and an environmental field of view (FOV) of the autonomous vehicle at step 301. The control logic 300 may further include the step of determining a first road boundary based on the navigation map and the approximate position of the autonomous vehicle, and a second road boundary based on the environmental FOV and the approximate orientation of the autonomous vehicle at step 302. The control logic 300 may further include the steps of determining at least one of an angular deviation and a lateral deviation between the first road boundary and the second road boundary at step 303, and positioning the autonomous vehicle on the navigation map by minimizing at least one the angular deviation and the lateral deviation at step 304.

In some embodiments, the navigation map may be a pre-generated light detection and ranging (LIDAR) map. Additionally, in some embodiments, receiving the approximate position of the autonomous vehicle at step 301 may include receiving the approximate position of the autonomous vehicle from a GPS sensor. Further, in some embodiments, receiving the approximate orientation of the autonomous vehicle at step 301 may include receiving the approximate orientation of the autonomous vehicle from an inertia measurement unit (IMU). Moreover, in some embodiments, receiving the environmental FOV at step 301 may include receiving the environmental FOV from a LIDAR scanner.

In some embodiments, determining the first road boundary at step 302 may include determining a pre-identified road boundary from the navigation map in a direction of movement of the autonomous vehicle. It should be noted that the direction of movement may be determined based on the approximate position of the autonomous vehicle. Similarly, in some embodiments, determining the second road boundary at step 302 may include determining a road boundary from the environmental FOV with respect to the approximate orientation of the autonomous vehicle. Further, in some embodiments, determining the second road boundary at step 302 may include determining a region in the environmental FOV that may be in a vicinity of at least a portion of the first road boundary, determining a plurality of data points ordered in a substantially straight line within the region and with respect to the approximate orientation of the autonomous vehicle, and determining a road boundary based one the plurality of data points.

In some embodiments, determining the angular deviation at step 303 may include determining an angle and an angular direction between the first road boundary and the second road boundary. Additionally, in some embodiments, positioning the autonomous vehicle by minimizing the angular deviation at step 304 may include aligning the autonomous vehicle in parallel to the first road boundary in a plurality of maneuverability sequences based on the angle and the angular direction. Similarly, in some embodiments, determining the lateral deviation at step 303 may include determining a distance and a shift direction between the first road boundary and the second road boundary. It should be noted that the first road boundary may be substantially parallel to the second road boundary. Further, in some embodiments, positioning the autonomous vehicle by minimizing the lateral deviation at step 304 may include shifting the autonomous vehicle in a plurality of maneuverability sequences based on the distance and the shift direction.

Figure 4:
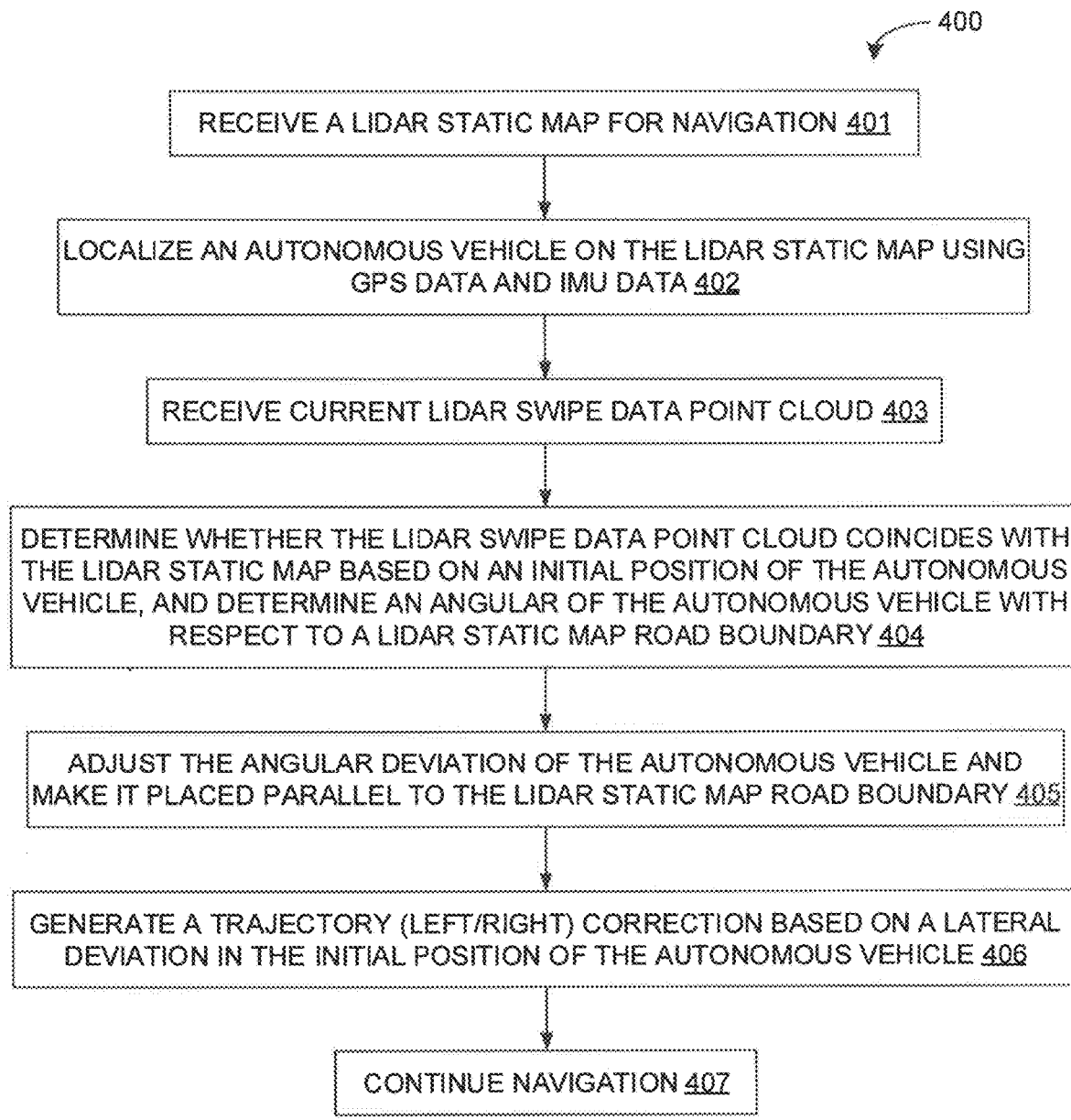
FIG. 4 is flow diagrams of a detailed exemplary process for positioning an autonomous vehicle on a navigation map in accordance with some embodiments of the present disclosure.

Referring now to FIG. 4, exemplary control logic 400 for positioning the autonomous vehicle on the navigation map is depicted in greater detail via a flowchart in accordance with some embodiments of the present disclosure. As illustrated in the flowchart, the control logic 400 may include the steps of receiving a LIDAR static map for navigation at step 401, localizing the autonomous vehicle on the LIDAR static map using GPS data and IMU data at step 402, and receiving current LIDAR swipe data point cloud at step 403. The control logic 400 may further include the steps of determining whether the LIDAR swipe data point cloud coincides with the LIDAR static map based on an initial position of the autonomous vehicle, and determining an angular deviation of the autonomous vehicle with respect to a LIDAR static map road boundary at step 404. The control logic 400 may further include the steps of adjusting the angular deviation of the autonomous vehicle and making it placed parallel to the LIDAR static map road boundary at step 405, generating a trajectory (left/right) correction based on a lateral deviation in the initial position of the autonomous vehicle at step 406, and continuing with the navigation from the corrected position at step 407. Each of the steps will be described in greater detail herein below.

At step 401, the navigation device may be initialized for positioning of the autonomous vehicle. The navigation device may receive a pre-generated LIDAR static map suitable for navigation of the autonomous vehicle. At step 402, the navigation device may localize the autonomous vehicle on a navigation path on the LIDAR static map using GPS data and IMU data. The navigation device may therefore determine a position (using GPS data received from GPS sensor) and an orientation (using IMU data from IMU) of the autonomous vehicle within the LIDAR static map. At step 403, the LIDAR scanner may be initialized to acquire point cloud information about its current environment around. The navigation device may receive the LIDAR swipe data point cloud representing the environmental FOV from the LIDAR scanner.

Figure 5:
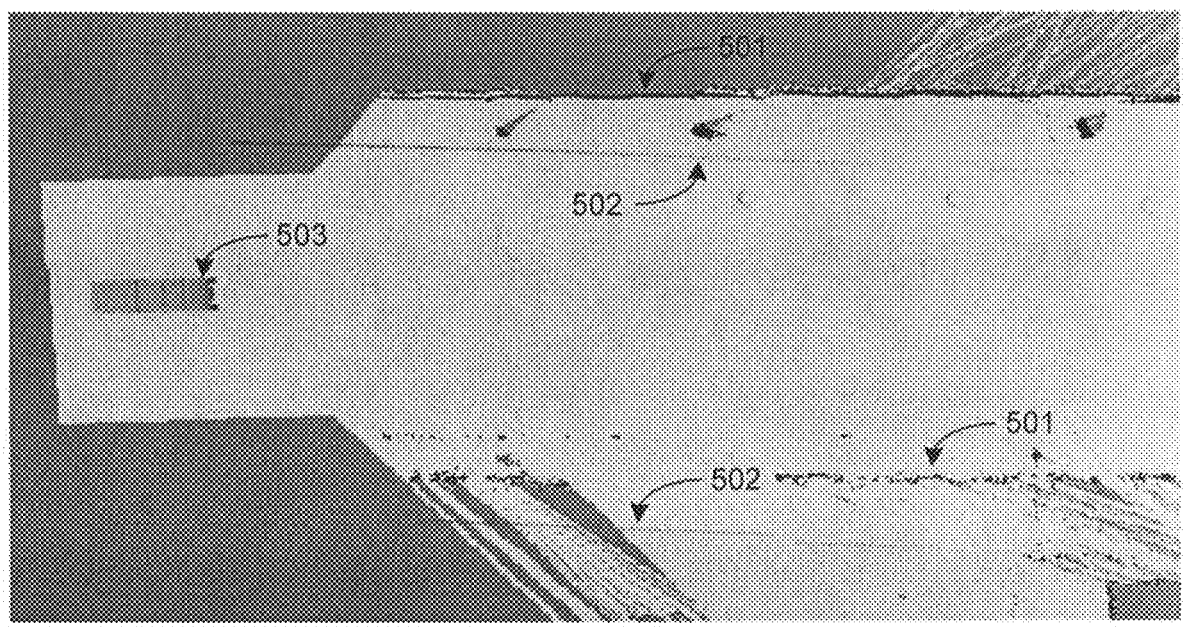
FIG. 5 illustrate an exemplary navigation map along with identified road boundaries and an exemplary environmental field of view (FOV) with determined road boundaries in accordance with some embodiments of the present disclosure.

At step 404, the navigation device may map the LIDAR swipe data point cloud on the LIDAR static map so as to determine whether the LIDAR swipe data point cloud coincides with the LIDAR static map based on an initial position of the autonomous vehicle. If not, the navigation device may then determine an angular deviation of the autonomous vehicle with respect to a LIDAR static map's road boundary. Referring now to FIG. 5, an exemplary navigation map along with identified or marked road boundaries 501 and an exemplary environmental FOV with determined road boundaries 502 (as currently seen from the autonomous vehicle 503) mapped onto the navigation map are illustrated in accordance with some embodiments of the present disclosure. The navigation device may be adapted to identify the LIDAR ring line (from LIDAR swipe data point cloud) obstructing the identified or marked road boundary 501 (from the LIDAR static map), and to determine an angular deviation between the determined road boundary 502 (from LIDAR swipe data point cloud) and the identified or marked road boundary 501 (from the LIDAR static map). In some embodiments, the navigation device may perform a straight line pattern match in a small FOV region (say, of 10×10 meter) aligned towards a direction of movement of the vehicle 503 (i.e., in front of vehicle) so as to identify the most prominent road boundary 501 marked in the LIDAR static map. The navigation device may then determine the straight line arrangement portion of the LIDAR data points in the same region by tracing the ring points and measuring the minimum deviation at a stretch, and store them into an array. The navigation device may then identify for straight line arranged point array (aligned with LIDAR's zero degree direction) as the determined road boundary 502. The navigation device may further determine an angle (i.e., theta) between LIDAR point array line 502 and LIDAR static map's identified road boundary line 501 in the small region. This angle (i.e., theta) is the angular deviation of the autonomous vehicle with respect to the LIDAR static map's road boundary.

Figure 6:
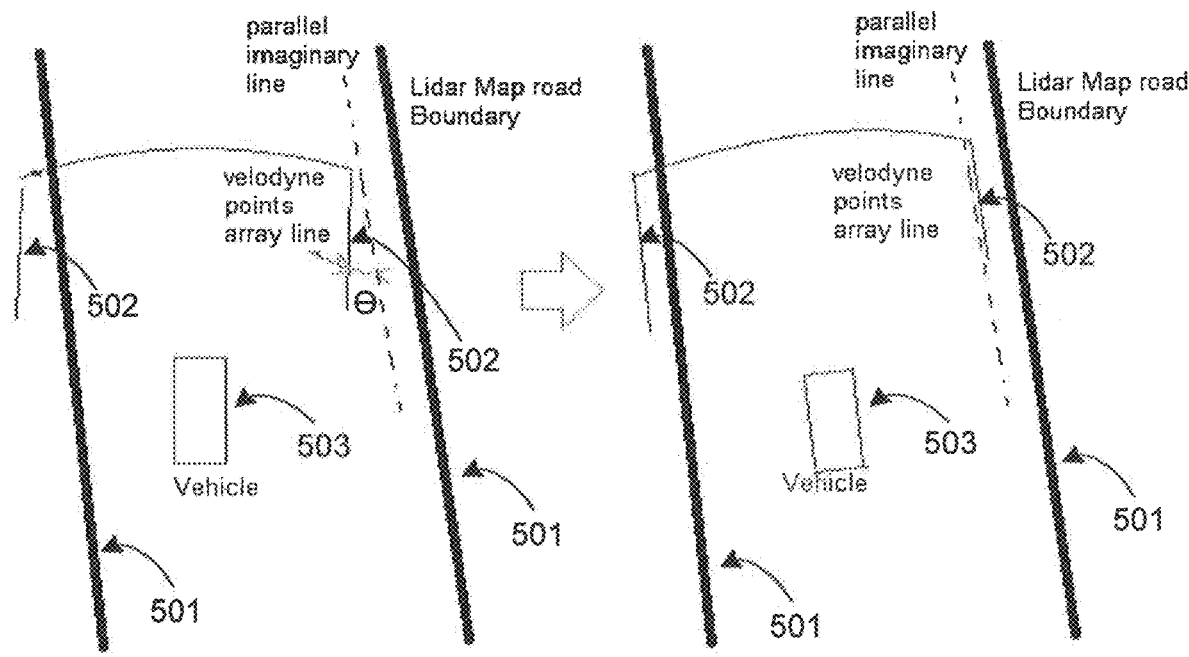
FIG. 6 illustrate an exemplary process for correction of angular deviation in accordance with some embodiments of the present disclosure.

Referring back to FIG. 4, at step 405, the navigation device may adjust the angular deviation (i.e., theta) of the autonomous vehicle and make it placed parallel to the LIDAR static map road boundary. Referring now to FIG. 6, an exemplary process for correction of the angular deviation (i.e., theta) is illustrated in accordance with some embodiments of the present disclosure. The navigation device may be adapted to adjust the angular deviation (i.e., theta) of the autonomous vehicle 503 with respect to LIDAR static map's road boundary 501 and make it placed parallel. In some embodiments, the autonomous vehicle may perform in place alignment of theta degree through a number of maneuverability sequences such that the LIDAR point cloud array cluster 502 (i.e., determined road boundary) may be in parallel to the LIDAR static map's road boundary 501. For example, the navigation device may adjust the angular deviation by enabling the autonomous vehicle 503 to go forward with 'theta+t' steering angle (as steering angle alignment may be typically greater than alignment of vehicle), and come backward with 'zero' steering angle multiple times. It should be noted that 't' may be a constant angle (say, 10 degrees) and may depend upon the vehicle. Further, in some embodiments, the navigation device may measure the IMU reading after each maneuverability sequence so as to determine whether angular shift 'theta' has been achieved. Upon achieving the required 'theta' value, the autonomous vehicle may stop.

Figure 7:
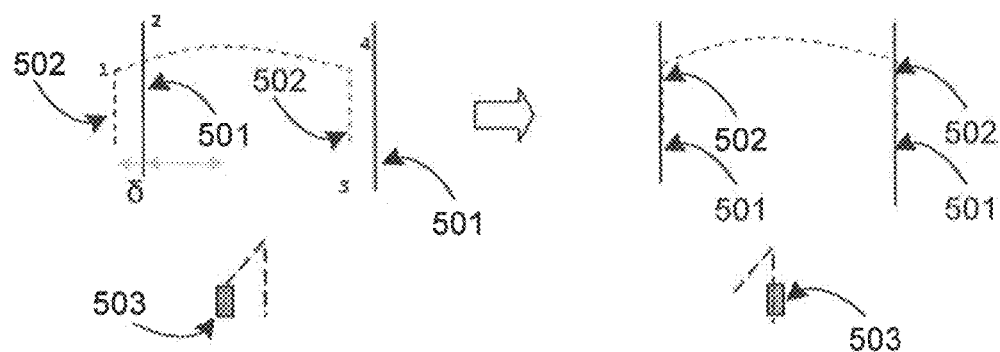
FIG. 7 illustrates an exemplary process for correction of lateral deviation in accordance with some embodiments of the present disclosure.

Referring back to FIG. 4, at step 406, the navigation device may generate a trajectory (left/right) correction based on the lateral deviation (i.e., delta) in the initial position of the autonomous vehicle. Referring now to FIG. 7, an exemplary process for correction of the lateral deviation (i.e., delta) is illustrated in accordance with some embodiments of the present disclosure. The navigation device may compare the coordinate array set of 4 near parallel line segments representing road boundaries (two road boundaries from the LIDAR static map 501 and two road boundaries from LIDAR data point array 502) with respect to the vehicle position. The navigation device may then determine its gross lateral deviation (i.e., delta) and also determine a shift direction (i.e., which side vehicle may need to shift). For example, if left road boundary (i.e., line 1) is data point array road boundary 502 while right road boundary (i.e., line 2) is LIDAR static map road boundary 501, then the autonomous vehicle 503 has to shift left. Further, for example, tracing perpendicular from a pre-determined distance (say, 6 meter) ahead of the autonomous vehicle 503 (i.e., toward left from the vehicle position), the navigation device may determine the distances of the LIDAR static map's road boundary 501 and LIDAR data point array road boundary 502. The difference between the two distances may provide a measure of lateral shift (i.e., delta) required for the autonomous vehicle 503. The navigation device may be adapted to generate the trajectory correction based on lateral deviation (i.e., delta) in the initial position of the autonomous vehicle. In some embodiments, the navigation device may perform the trajectory correction through a number of maneuverability sequences such that the LIDAR point cloud array cluster 502 (i.e., determined road boundary) may align to the LIDAR static map's road boundary 501. In some embodiments, the maneuverability sequences may include a trajectory along two arms of a right angle triangle—first forward along the arm opposite the 90 degree angle, and then reverse along the arm adjacent to 90 degree angle—such that the final position of the vehicle became the farthest end of the 3 arm. It should be noted that the right angle triangle may be selected such that the $3^{rd}$ arm length may be substantially equal to the lateral deviation (i.e., delta). For example, for a rightward shift, the navigation device may enable the autonomous vehicle 503 to go forward with right moved steering till the autonomous vehicle 503 achieves the 'delta' lateral shift, and then come back straight to be at parallel to its initial position.

Referring back to FIG. 4, at step 407, the navigation device may continue with the navigation from the corrected position. Thus, the navigation device may perform subsequent path planning and navigation from the corrected position.

In short, the navigation device may compare the road boundaries 501 marked on the pre-generated LIDAR static map with the road boundaries 502 determined from current LIDAR swipe data points from the current position on the autonomous vehicle 503. On measuring deviations (i.e., angular deviation as well as lateral deviation), the navigation device may determine a number of maneuverability sequences for the autonomous vehicle 503 so as to minimize the deviations. The autonomous vehicle 503 may position itself by performing the number of maneuverability sequences. For example, the autonomous vehicle 503 may first align itself in parallel to the marked road boundary 501 to eliminate the angular deviation, and may then generate a reverse 'V' shaped (i.e., right angle's arm) trajectory to eliminate the lateral deviation. It should be noted that, in some embodiments, the initial positioning may be completed once the percentage of autonomous vehicle deviation with respect to the LIDAR static map has reached less than a pre-determined threshold.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 8:
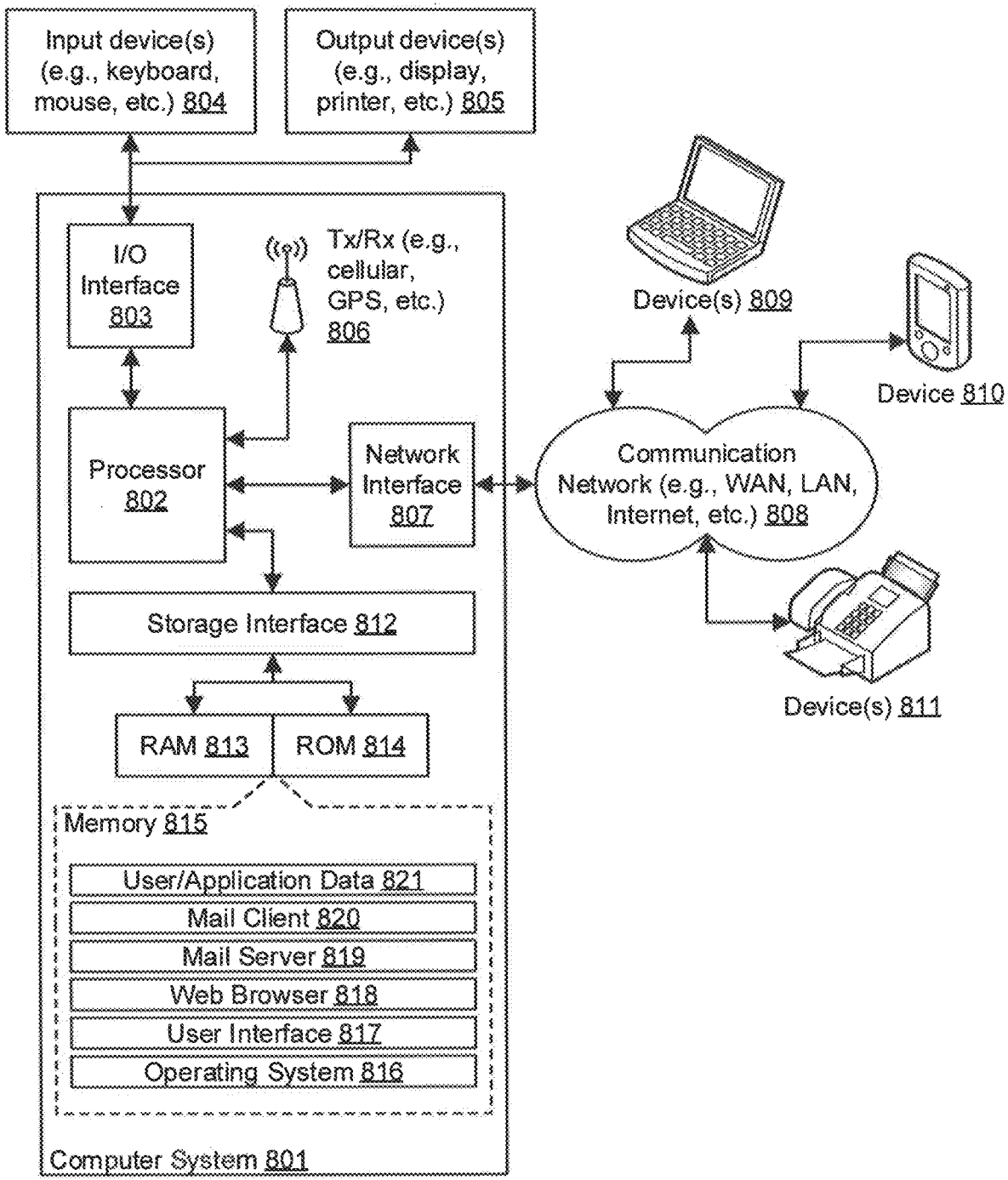
FIG. 8 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 8, a block diagram of an exemplary computer system 801 for implementing embodiments consistent with the present disclosure is illustrated. Variations of computer system 801 may be used for implementing system 100 and positioning engine 200 for positioning an autonomous vehicle on a navigation map. Computer system 801 may include a central processing unit ("CPU" or "processor") 802. Processor 802 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 802 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 802 may be disposed in communication with one or more input/output (I/O) devices via I/O interface 803. The I/O interface 803 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 803, the computer system 801 may communicate with one or more I/O devices. For example, the input device 804 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 805 may be a printer, fax machine, video display (e.g., cathode ray tube (CRT), liquid crystal display (LCD), light-emitting diode (LED), plasma, or the like), audio speaker, etc. In some embodiments, a transceiver 806 may be disposed in connection with the processor 802. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11ab/g/n, Bluetooth, FM, global positioning system (GPS), 2G/3G HSDPAIHSUPA communications, etc.

In some embodiments, the processor 802 may be disposed in communication with a communication network 808 via a network interface 807. The network interface 807 may communicate with the communication network 808. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 808 may include, without limitation, a direct interconnection, local area network (LAN), wide area network (WAN), wireless network (e.g., using Wireless Application Protocol), the Internet, etc. Using the network interface 807 and the communication network 808, the computer system 801 may communicate with devices 809, 810, and 811. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 801 may itself embody one or more of these devices.

In some embodiments, the processor 802 may be disposed in communication with one or more memory devices (e.g., RAM 813, ROM 814, etc.), collectively referred to as memory 815, via a storage interface 812. The storage interface 812 may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices 815 may store a collection of program or database components, including, without limitation, an operating system 816, user interface application 817, web browser 818, mail server 819, mail client 820, user/application data 821 (e.g., any data variables or data records discussed in this disclosure), etc. The operating system 816 may facilitate resource management and operation of the computer system 801. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 817 may facilitate display, execution, interaction, manipulation, or operation of program components through textual or graphical facilities. For example, user interfaces may provide computer interaction interface elements on a display system operatively connected to the computer system 801, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 801 may implement a web browser 818 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 801 may implement a mail server 819 stored program component. The mail server may be an Internet mail server such as Microsoft Exchange, or the like. The mail server may utilize facilities such as ASP, ActiveX, ANSI C++/C #, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 801 may implement a mail client 820 stored program component. The mail client may be a mail viewing application, such as Apple Mail, Microsoft Entourage, Microsoft Outlook, Mozilla Thunderbird, etc.

In some embodiments, computer system 801 may store user/application data 821, such as the data, variables, records, etc. (e.g., navigation map, navigation path, GPS data, IMU data, LIDAR data, marked road boundaries, determined road boundaries, angular deviation, lateral deviation, maneuverability sequences, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above may provide for initial positioning of the autonomous vehicle on a pre-generated navigation map. Such in-position vehicle alignment at the start of autonomous navigation may enable an efficient path planning and a smooth autonomous navigation. Further, as will be appreciated, the techniques described in the embodiments discussed above are independent of specific landmarks at per-determined positions, and therefore work accurately on new unmarked road areas.

The specification has described system and method for positioning an autonomous vehicle on a navigation map. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for positioning an autonomous vehicle on a navigation map, the method comprising:
    receiving, by a navigation device, the navigation map, an approximate position and an approximate orientation of the autonomous vehicle on the navigation map, and an environmental field of view (FOV) of the autonomous vehicle;
    determining, by the navigation device, a first road boundary based on the navigation map and the approximate position of the autonomous vehicle, and a second road boundary based on the environmental FOV and the approximate orientation of the autonomous vehicle;
    determining, by the navigation device, at least one of an angular deviation and a lateral deviation between the first road boundary and the second road boundary; and
    positioning, by the navigation device, the autonomous vehicle on the navigation map by minimizing at least one the angular deviation and the lateral deviation, based on a plurality of maneuverability sequences,
        wherein the autonomous vehicle is positioned based on command velocities generated for each of the plurality of maneuverability sequences, and
        wherein a maneuverability sequence from the plurality of maneuverability sequences comprises a trajectory along two arms of a right angle triangle, and
        wherein a first portion of the trajectory comprises a forward motion along an arm of the triangle opposite to the right angle, and a second portion of the trajectory comprises a reverse motion along an arm adjacent to the right angle of the triangle.

2. The method of claim 1, wherein the navigation map is a pre-generated light detection and ranging (LIDAR) map, wherein the approximate position of the autonomous vehicle is received from a GPS sensor, wherein the approximate orientation of the autonomous vehicle is received from an inertia measurement unit (IMU), and wherein the environmental FOV is received from a LIDAR scanner.

3. The method of claim 1, wherein determining the first road boundary comprises determining a pre-identified road boundary from the navigation map in a direction of movement of the autonomous vehicle, and wherein the direction of movement is determined based on the approximate position of the autonomous vehicle.

4. The method of claim 1, wherein determining the second road boundary comprises determining a road boundary from the environmental FOV with respect to the approximate orientation of the autonomous vehicle.

5. The method of claim 1, wherein determining the second road boundary comprises:
    determining a region in the environmental FOV in a vicinity of at least a portion of the first road boundary;
    determining a plurality of data points ordered in a straight line within the region and with respect to the approximate orientation of the autonomous vehicle; and
    determining a road boundary based one the plurality of data points.

6. The method of claim 1, wherein determining the angular deviation comprises determining an angle and an angular direction between the first road boundary and the second road boundary.

7. The method of claim 6, wherein positioning the autonomous vehicle by minimizing the angular deviation comprises aligning the autonomous vehicle in parallel to the first road boundary in the plurality of maneuverability sequences based on the angle and the angular direction.

8. The method of claim 1, wherein determining the lateral deviation comprises determining a distance and a shift direction between the first road boundary and the second road boundary, and wherein the first road boundary is parallel to the second road boundary.

9. The method of claim 8, wherein positioning the autonomous vehicle by minimizing the lateral deviation comprises shifting the autonomous vehicle in the plurality of maneuverability sequences based on the distance and the shift direction.

10. A system for positioning an autonomous vehicle on a navigation map, the system comprising:
    a navigation device comprising at least one processor and a computer-readable medium storing instructions that, when executed by the at least one processor, cause the at least one processor to perform operations comprising:
        receiving the navigation map, an approximate position and an approximate orientation of the autonomous vehicle on the navigation map, and an environmental field of view (FOV) of the autonomous vehicle;
        determining a first road boundary based on the navigation map and the approximate position of the autonomous vehicle, and a second road boundary based on the environmental FOV and the approximate orientation of the autonomous vehicle;
        determining at least one of an angular deviation and a lateral deviation between the first road boundary and the second road boundary;
        positioning the autonomous vehicle on the navigation map by minimizing at least one the angular deviation and the lateral deviation, based on a plurality of maneuverability sequences,
            wherein the autonomous vehicle is positioned based on command velocities generated for each of the plurality of maneuverability sequences, and
            wherein a maneuverability sequence from the plurality of maneuverability sequences comprises a trajectory along two arms of a right angle triangle, and
            wherein a first portion of the trajectory comprises a forward motion along an arm of the triangle opposite to the right angle, and a second portion of the trajectory comprises a reverse motion along an arm adjacent to the right angle of the triangle.

11. The system of claim 10, wherein the navigation map is a pre-generated light detection and ranging (LIDAR) map, wherein the approximate position of the autonomous vehicle is received from a GPS sensor, wherein the approximate orientation of the autonomous vehicle is received from an inertia measurement unit (IMU), and wherein the environmental FOV is received from a LIDAR scanner.

12. The system of claim 10, wherein determining the first road boundary comprises determining a pre-identified road boundary from the navigation map in a direction of movement of the autonomous vehicle, and wherein the direction of movement is determined based on the approximate position of the autonomous vehicle.

13. The system of claim 10, wherein determining the second road boundary comprises determining a road boundary from the environmental FOV with respect to the approximate orientation of the autonomous vehicle by:
    determining a region in the environmental FOV in a vicinity of at least a portion of the first road boundary;
    determining a plurality of data points ordered in a straight line within the region and with respect to the approximate orientation of the autonomous vehicle; and determining a road boundary based one the plurality of data points.

14. The system of claim 10, wherein determining the angular deviation comprises determining an angle and an angular direction between the first road boundary and the second road boundary, and wherein positioning the autonomous vehicle by minimizing the angular deviation comprises aligning the autonomous vehicle in parallel to the first road boundary in the plurality of maneuverability sequences based on the angle and the angular direction.

15. The system of claim 10, wherein determining the lateral deviation comprises determining a distance and a shift direction between the first road boundary and the second road boundary, wherein the first road boundary is parallel to the second road boundary, and wherein positioning the autonomous vehicle by minimizing the lateral deviation comprises shifting the autonomous vehicle in the plurality of maneuverability sequences based on the distance and the shift direction.

16. A non-transitory computer-readable medium storing computer-executable instructions for:
receiving the navigation map, an approximate position and an approximate orientation of the autonomous vehicle on the navigation map, and an environmental field of view (FOV) of the autonomous vehicle;
determining a first road boundary based on the navigation map and the approximate position of the autonomous vehicle, and a second road boundary based on the environmental FOV and the approximate orientation of the autonomous vehicle;
determining at least one of an angular deviation and a lateral deviation between the first road boundary and the second road boundary; and
positioning the autonomous vehicle on the navigation map by minimizing at least one the angular deviation and the lateral deviation, based on a plurality of maneuverability sequences,
wherein the autonomous vehicle is positioned based on command velocities generated for each of the plurality of maneuverability sequences, and
wherein a maneuverability sequence from the plurality of maneuverability sequences comprises a trajectory along two arms of a right angle triangle, and
wherein a first portion of the trajectory comprises a forward motion along an arm of the triangle opposite to the right angle, and a second portion of the trajectory comprises a reverse motion along an arm adjacent to the right angle of the triangle.

17. The non-transitory computer-readable medium of claim 16, wherein determining the first road boundary comprises determining a pre-identified road boundary from the navigation map in a direction of movement of the autonomous vehicle, and wherein the direction of movement is determined based on the approximate position of the autonomous vehicle.

18. The non-transitory computer-readable medium of claim 16, wherein determining the second road boundary comprises determining a road boundary from the environmental FOV with respect to the approximate orientation of the autonomous vehicle by:
determining a region in the environmental FOV in a vicinity of at least a portion of the first road boundary;
determining a plurality of data points ordered in a straight line within the region and with respect to the approximate orientation of the autonomous vehicle; and
determining a road boundary based one the plurality of data points.

19. The non-transitory computer-readable medium of claim 16, wherein determining the angular deviation comprises determining an angle and an angular direction between the first road boundary and the second road boundary, and wherein positioning the autonomous vehicle by minimizing the angular deviation comprises aligning the autonomous vehicle in parallel to the first road boundary in the plurality of maneuverability sequences based on the angle and the angular direction.

20. The non-transitory computer-readable medium of claim 16, wherein determining the lateral deviation comprises determining a distance and a shift direction between the first road boundary and the second road boundary, wherein the first road boundary is parallel to the second road boundary, and wherein positioning the autonomous vehicle by minimizing the lateral deviation comprises shifting the autonomous vehicle in the plurality of maneuverability sequences based on the distance and the shift direction.

* * * * *